United States Patent [19]

Chi et al.

[11] Patent Number: 5,053,362

[45] Date of Patent: Oct. 1, 1991

[54] CERAMIC FIBER REFRACTORY MOLDABLE COMPOSITIONS

[75] Inventors: Frank K. Chi, Williamsville, N.Y.; Tanyol Halil, Melbourne, Australia

[73] Assignee: The Carborundum Company, Niagara Falls, N.Y.

[21] Appl. No.: 250,030

[22] Filed: Sep. 27, 1988

[51] Int. Cl.$^5$ ............................................. C04B 35/80
[52] U.S. Cl. ........................................ 501/95; 501/94; 501/128; 501/133; 106/197.1; 106/197.2
[58] Field of Search .................. 501/95, 94, 128, 133; 106/197.1, 197.2

[56] References Cited

U.S. PATENT DOCUMENTS

| | | |
|---|---|---|
| 3,753,923 | 8/1973 | Wada . |
| 3,758,418 | 9/1973 | Leonard, Jr. et al. . |
| 3,830,892 | 8/1974 | Wada . |
| 3,835,054 | 9/1974 | Olewinski et al. ............... 501/95 X |
| 3,916,057 | 10/1975 | Hatch . |
| 4,048,363 | 9/1977 | Langer . |
| 4,174,331 | 2/1976 | Myles . |
| 4,248,752 | 6/1979 | Myles . |
| 4,305,992 | 12/1981 | Langer . |
| 4,385,135 | 5/1983 | Langer . |
| 4,822,679 | 4/1989 | Cerdan-Diaz et al. ........... 501/95 X |
| 4,857,489 | 8/1989 | Bearden ............................ 501/95 X |

OTHER PUBLICATIONS

America Journal, Apr. 1988, vol. 2, No. 4, under News-Briefs.
Standard Oil Engineered Materials Package.

Primary Examiner—Karl Group
Attorney, Agent, or Firm—Larry W. Evans; Joseph G. Curatolo; Teresan W. Gilbert

[57] ABSTRACT

A moldable refractory composition containing from about 42 to about 83% by weight of a liquid vehicle, such as water; from about 13 to 50% by weight of ceramic fiber; from about 0.5 to 7% by weight of an inorganic binder derived from an inorganic colloidal dispersion having active hydroxyl groups capable of reacting with hydroxyl groups of the ceramic fiber; and from about 0.5 to 5% by weight of a high molecular weight organic resin which serves multiple functions including tackifier of the wet composition, cohesiveness of the wet composition, appropriate rheology of the wet composition to provide shelf life and a wide range of applications and in dry composition to provide green strength. Also described is the method of manufacture for the subject refractory moldable composition. Upon drying, the moldable composition adheres well to surfaces such as those encountered in furnacing applications and construction applications to metals and other ceramic materials and dries to give an essentially crack-free refractory shape which exhibits greater resilience than heretofore known moldable refractory compositions. The dried moldable composition is useful as thermal insulation at temperatures up to 1650° C. (3000° F.) dependent upon the type of ceramic fibers and inorganic binders contained as ingredients in the composition.

14 Claims, 4 Drawing Sheets

Figure 4A:
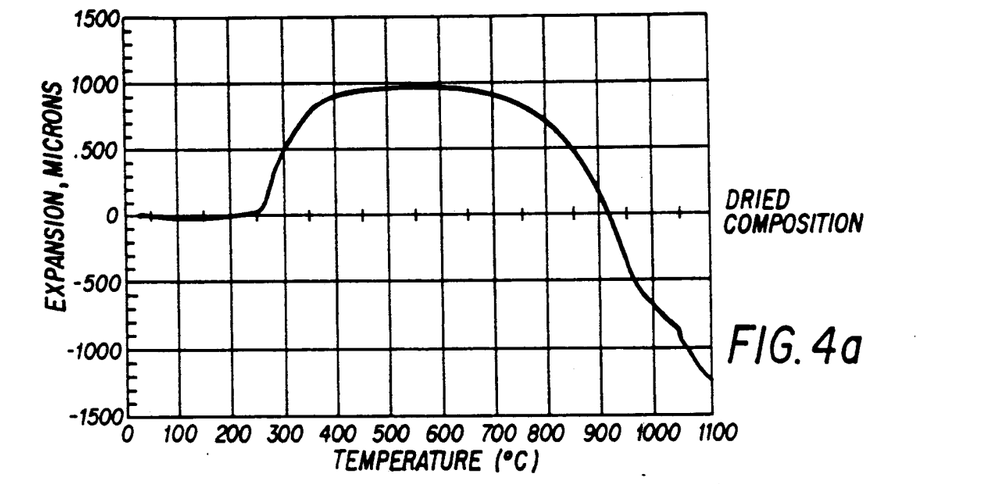
Figure 4B:
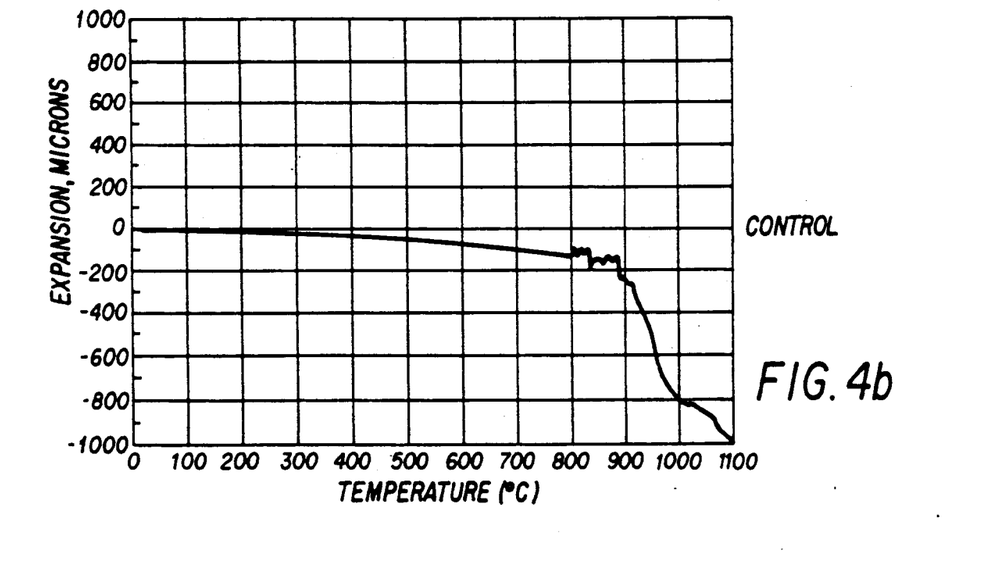

FIG. 4b

CERAMIC FIBER REFRACTORY MOLDABLE COMPOSITIONS

The present invention relates to moldable refractory compositions. More particularly, the present invention relates to moldable refractory compositions capable of being applied hydraulically which contain ceramic fiber, inorganic binder and an organic binder in a liquid vehicle.

BACKGROUND OF THE INVENTION

There exists need for refractory moldable compositions capable of withstanding high temperatures which can be readily formed into a variety of shapes. Such refractory moldables may be used in many applications including, by way of example only, filling and repair of expansion joints in refractory construction, hot patching of refractory lining in kiln and boiler tube walls, and in building construction as a fire retardant seal.

Known refractory moldable compositions such as those described in U.S. Pat. Nos. 4,248,752 and 4,174,331 to Myles are capable of withstanding high temperature and can be formed into a variety of shapes. However, these known moldables have a relatively high viscosity which limits their application, particularly through hydraulic means such as pumping or caulking. Additionally the cost of these known moldables is relatively high. In many applications, the cost of the moldable compositions taught by Myles may not be economically justified. The present invention provides refractory moldable compositions useful as thermal insulation at temperatures up to 1650° C. Another problem with known refractory moldable compositions is their lack of resilience upon drying and setting. In many applications, the amount of resilience inherent in known refractory moldables is inadequate to withstand the thermal expansion and contraction inherent in the operational cycle of the apparatus to which the refractory composition is applied and separate therefrom during service. Certain embodiments of refractory moldable compositions, according to the present invention, provide greater resiliency and resistance to cracking or separation from the surface to which they have been applied.

SUMMARY OF THE INVENTION

This invention relates to refractory moldable compositions for producing thermally insulating materials to meet the needs described above. In particular, this invention relates to moldable refractory compositions which comprise, and may consist essentially of, from about 42 to 83% by weight liquid vehicle; from about 13 to about 50% by weight ceramic fiber; from about 0.5 to about 7% by weight an inorganic binder derived from an inorganic colloidal dispersion; e.g., colloidal silica, colloidal alumina and/or other colloidal oxides or mixtures of these; and from about 0.5 to about 5% by weight of a high molecular weight organic polymer which is soluble in the liquid vehicle and serves multiple functions including as a tackifier, a binder, and a rheological modifier; and optionally, but preferably, a biocide to prevent degradation of the organic polymer to enhance shelf life.

Further, the invention relates to a moldable refractory composition consisting essentially of:

a. from about 42 to about 83% by weight liquid vehicle;
b. from about 13 to about 50% by weight ceramic fiber;
c. from about 0.5 to about 7% by weight of an inorganic binder derived from a colloidal dispersion; and
d. from about 0.5 to 5% by weight of a high molecular weight polar organic polymer;
e. the liquid vehicle being a solvent for the organic binder and a non-solvent for the ceramic fiber;
f. the wet composition having a percent solid of about 25 to about 40, a density of about 70 lbs/ft3, a dry density of about 18 to about 25 lbs/ft3 and a fired density of about 20 to about 27 lbs/ft3; and
g. the wet composition having a complex viscosity of from about 1000 poise to about 10000 poise at about 100 rpm and a dry MOR of at least 200 psi and a fired MOR of at least 100 psi after firing at about 2000° F. for about 24 hrs.

According to another aspect of the present invention, there is provided a method for making refractory moldable composition which comprises dispersing and dissolving biocide, if present, and a high molecular weight organic polymer to form a thick solution, thereafter adding an inorganic colloidal dispersion and stirring until homogenous mixture of paste-like consistency is obtained; and thereafter adding ceramic fiber and mixing until homogenous mixture is obtained.

According to a further aspect, this invention relates to a method for making moldable refractory shapes which comprises forming a refractory moldable composition as afore described, molding the composition into the desired shape and location and evaporating the liquid vehicle from the refractory composition.

DETAILED DESCRIPTION OF THE INVENTION

Unless otherwise stated at the point of use, the following definitions apply:

All percentages, portions, and values with respect to composition are expressed in terms of weight.

Viscosities of the organic binders in aqueous solutions were determined using a Brookfield model RVTD digital Viscometer.

Viscosities of the refractory moldable composition were determined using a Rheometric model 705 Mechanical Spectrometer. Complex viscosity (eta) is obtained and is expressed in units of poise.

"Tack" and related forms as used herein refers to adhesive stickiness of the refractory moldable compositions before becoming completely dried.

"MOR" as used herein refers to modulus of rupture and is the maximum stress per unit area that a specimen of green or fired refractory moldable composition can withstand without breaking when exposed to bending loading. As employed herein MOR was determined according to ASTM Procedure D-790.

The term "green" or "dry" when used in combination with or in reference to a physical property; e.g., adhesion, cohesion, or viscosity or tack or density, refers to that physical property of the moldable refractory composition when dried to remove the liquid vehicle but not yet fired at or above the decomposition temperature of the organic polymer component.

"Consistency"—lighter, heavier, creamier, etc with reference to viscosity.

The term "wet" when used in combination with or in reference to a physical property; e.g., viscosity, tack, density, refers to that physical property of the moldable refractory composition or its components prior to complete removal of the liquid vehicle of the moldable refractory composition.

"Bulk density" as used herein is the weight per unit volume of the wet or dry or fired composition, including in the volume considered, any void spaces between particles of solid matter or within particles of solid matter.

"Fired" when used in combination with or in reference to a physical property; e.g., MOR, adhesion, shrinkage, or resilience, refers to that physical property of the moldable refractory composition subsequent to drying to remove the liquid vehicle and heating to a temperature at or above the decomposition temperature of the organic polymer component.

"Shot" refers to small spherical or teardrop-shaped particles of ceramic material. A shot particle is appended to each ceramic fiber formed by blowing of molten ceramic into fiber.

As used herein, the terms including, comprising, having and containing are synonymous.

Materials

The moldable refractory compositions of this invention contain a suitable liquid vehicle, ceramic fiber, inorganic binder, organic binder and optionally a refractory filler. These moldable refractory compositions can be readily poured, cast, gunned (caulked), pumped or otherwise formed into a desired shape at a desired location. The present moldable refractory compositions adhere well to a wide variety of substrates including known refractory materials and metals. The present moldable refractory compositions after placement dry to give an essentially crack-free refractory shape and are useful as thermal insulation at temperatures up to 1650° °C. (3000° F.), dependent directly on the type of ceramic fiber contained in the composition.

The first component of the moldable refractory composition of this invention is a liquid vehicle which may be present in amount from about 42 to 83% by weight of the composition. The liquid vehicle must, of course, be compatible with other components of the composition. The liquid vehicle should be a non-solvent for the ceramic fiber and a solvent for the organic binder component. While it is preferable that the liquid vehicle also be a solvent for the inorganic binder, such is not critical. However, it is important that the inorganic binder be stably dispersible in the liquid vehicle. Water is the most highly preferred liquid vehicle for this moldable refractory composition because it is inexpensive and presents no adverse effects to the environment or workmen. Other liquid vehicles can also be used such as methanol, ethanol, isopropanol, butanol, ethylene glycol, diethylene glycol and mixtures thereof, including mixtures with water. Such mixtures are useful in certain applications; for example, to enable use of organic binder component materials which would otherwise be unacceptable due to their low solubility in water alone and also to prevent freezing of the moldable refractory composition when packaged and stored where exposed to temperatures below the freezing point of water. From an economic perspective, it is usually desirable to have the liquid vehicle present in an amount between 70 and 76% in the composition.

The second component of the moldable refractory composition of this invention is ceramic fiber, which is present in an amount from about 13% to about 50% perferably about 20 to about 25%, by weight in the wet composition. Ceramic fiber provides high temperature insulating properties of the dried and fired compositions of the present invention. The ceramic fiber is preferably selected from the group consisting of fibers of alumina-silica, alumina-silica-zirconia, mullite, including polycrystalline mullite, alumina, boron carbide, boron nitride, silica, silicon nitride, silicon carbide, calcium aluminosilicate, glass, mineral wool and the like or mixtures thereof. The particular fiber or blend of fibers is selected dependent upon the temperature and atmospheric conditions anticipated in service in a manner well known to those skilled in the art of high temperature thermal insulation employing ceramic fibers.

The fiber should have an average diameter of about 0.5 microns to about 20 microns and an average aspect ratio (length of fiber to diameter of fiber ratio) of from at least 20 to 1 to 3000 to 1. Too high an aspect ratio will cause difficulty in dispersing fiber and too low may reduce the strength of the final fired moldable refractory composition.

Of the above stated classes of fibers, those of aluminasilica and alumina-silica-zirconia, such as those sold by Standard Oil Engineered Materials Company (SEM) of Niagara Falls, N.Y. under the trademark Fiberfraxx ® ceramic fibers are preferred for installations where the continuous use temperature will not exceed 1260° C. (2300° F.). When higher surface temperatures are contemplated, Fiberfaxx ® aluminosilicate ceramic fibers may be admixed with Fibermaxx ® polycrystalline mullite fibers available from the same source. When these polycrystalline mullite fibers alone are employed in compositions of this invention, continuous service temperatures may be as high as 1650° C. (3000°F.). For applications involving continuous service temperatures not exceeding 1260° C. (2300°F.), Fiberfrax ® chopped fiber which is an aluminosilicate ceramic fiber having a mean fiber diameter of 2 to 2.5 microns and mean fiber lengths of around 50 to 500 microns is preferred for economic reasons.

Fibers produced by blowing, spinning, sol gel and other methods may be used in compositions of the present invention. Those fiber types which are free of shot generally result in compositions which are lighter and creamier in consistency at equal weight fraction of fiber and all else within the composition being equal. Use of shot-free fiber results in compositions of greater thermal insulation value than one of utilizing shot-containing fiber at equal dried density.

A third necessary ingredient of the moldable refractory composition of this invention is an inorganic binder which functions to secure the ceramic fibers to one another and to the substrate when dry; contributes to wet and green adhesion and wet and green cohesion; and when the composition is in service at temperatures above the decomposition temperature of any organic components, securely binds the ceramic fibers to one another and to the substrate. The inorganic binder is present in an amount of from about 0.5 to about 7%, preferably about 3 to about 5% on a dry-weight basis in compositions of this invention. The inorganic binder is derived from finely divided (colloidal) sol of an inorganic high temperature refractory material. A sol is a stable dispersion of discrete colloid size particles in aqueous media. Sols have extremely small particle size and large surface areas. Suitable sols include those of silica, alumina, zirconia and the like and mixtures of these. Suitable sols have active hydroxyl groups capable of reacting with the hydroxyl groups on the ceramic fiber. Most preferred, however, is colloidal silica because it has an ample supply of silanol (-SiOH) groups on the surface of colloidal silica particles. Suitable sols interact with appropriately selected organic binders as a thickening agent for the wet compositions. Of the various types of sols, silica is preferred for most applications unless specific resistance to chemical attack or higher service temperature indicates a need to utilize a different material.

Colloidal silica sols may be acidic or basic in nature. Of these, the basic-type material is preferred because efforts to date have indicated it provides greater shelf life of the wet composition. Also, where the moldable refractory composition is to be placed in contact with a metal substrate; for example, a steel lining of a furnace, corrosion induced in the metal substrate is minimal when a basic-type sol is employed as contrasted with that induced following use of an acid-type sol. One of the colloidal silicas highly preferred for use in compositions of this invention is an anionic basic-type product of E. I. duPont de Nemours marketed as Ludox ®HS-40 colloidal silica. This product is an aqueous dispersion of 40% amorphous silica, the silica particles having an average size of 13–14 nm, a pH of about 9.7, the suspension having a density of 10.8 lbs./gallon corresponding to a specific gravity of 1.28. It is understood, however, that the present invention is not restricted to use of Ludox ® brand of colloidal silica or to basic-type colloidal silica. A suitable acid-type colloidal silica sol is Nalco ® 1034*A, a product of Nalco Chemical Company which has a pH of about 3.2, an average particle size of about 20 nm and contains 34% by weight of amorphous silica.

Other suitable inorganic binder components include colloidal alumina; e.g., Nalco ® ISJ-614 from Nalco Chemical Company, Oakbrook, Ill. and colloidal zirconia; e.g., zirconia sol-acetate statilized from Remet Corporation, Chadwicks, N.Y.

The fourth necessary ingredient in the moldable refractory compositions of the present invention is an organic binder which serves multiple functions including binding the fiber at room temperature to one another in the dried green refractory moldable to provide it with green strength, providing appropriate rheological properties; e.g., viscosity consistency to the moldable composition to facilitate installation of the moldable composition; maintaining the ceramic fibers in suspension in the liquid vehicle to provide shelf life; and binding to the substrate. Because the liquid vehicles to be employed in the present invention are polar, and of these water is most preferred, any water soluble organic polymers which contain a large number of polar functionalities may be used as organic binders provided they contribute the functions given above. Suitable organic polymers are those which when wetted with the liquid vehicle impart tackiness or adhesive properties to the fibers and to the intended substrates to which the moldable refractory composition is to be applied. Suitable organic polymers include polyacrylamide, polysodiumacrylate, polyethyleneoxide, polyvinyl alcohol, hydroxyethylcellulose, methylhydroxyethylcellulose, hydroxypropylmethylcellulose, carboxymethylcellulose and mixtures of these. The organic component may be anionic, non-ionic or cationic, selection being made with reference to the nature of the inorganic binder to assure compatability and avoid precipitation prior to application and drying. Generally, non-ionic organic binder components may be used with any of the recommended inorganic binder components; anionic organic binder components should be used with anionic inorganic components; and cationic organic binder components should be used with cationic inorganic binder components.

The amount of organic binder used in compositions of this invention should be minimized, for economic reasons, but must be present in sufficient amount to wet out all the fibers in the composition to prevent fiber aggregation and agglomeration, and to provide adequate viscosity or consistency for easy application and to maintain the ceramic fibers in suspension to provide shelf life and to provide adhesion to the substrates. The optimum amount of binder necessary to accomplish these objectives is determined empirically as the different chemical families of binders listed above as well as individual members differ in their effectiveness. Use of insufficient binder results in separation upon standing of the wet composition; i.e., inadequate shelf life. Use of an excessive amount is simply uneconomic and results in excessive viscosity making application more difficult. It has been determined that about 0.5 to about 5%, preferably about 1 to about 3% by weight of high molecular weight organic binder is adequate to fulfill the aforestated purposes.

Of the aforementioned organic binders, the most preferred is high molecular weight hydroxyl containing cellulose which can be easily incorporated into water without forming lumps, provides adequate viscosity or consistency for easy application and retains water to maintain a reasonably good shelf life. The molecular weight of the organic binder should be at least 0.8 million. Most preferred for compositions according to this invention is a hydroxyethylcellulose (non-ionic polymer) with an average molecular weight of 1.2 million available under the trademark Natrasol ® 250 HHR from Hercules, Inc. Other suitable organic binders include methyl hydroxyethylcellulose (Tylos MHB 30,000 available from Hoechst); high molecular weight polyethylene oxide; e.g., Polyox ® WSR-301 available from Union Carbide Company, and polyacrylamides; e.g Reten ® 421, (anionic) available from Hercules, Inc. and Nalco ® 2SS-322 (anionic) and Nalco ® 1SJ-832 (anionic) available from Nalco Chemical Company are less preferred than the hydroxyethylcellulose binder because insufficient dispersing and balling of fiber were observed when using these categories of organic binder materials. However, it has been observed that polyethylene oxide and polyacrylamide resins render high tackiness and good water retention capability to the compositions of this invention. By mixing or combining hydroxyl containing cellulose polymers with polyethylene oxide or polyacrylamide polymers, one is able to obtain moldable refractory compositions with a range of viscosities and tackiness.

When high molecular weight cellulose resins are used as the organic binder, it is necessary to include a biocide in the moldable refractory composition to prevent degradation of the cellulose resins by bacteria. Typically the biocide is added in amount from about 0.05 to about 0.1% by weight. Suitable biocides for use with cellulose resins in compositions according to this invention are Dowicil ® 75, an anti-mic,robial agent manufactured by Dow Chemical Company and Nalco ® 2385 preservative manufactured by Nalco Chemical Company.

Manufacture of Moldable Refractory Compositions of this Invention

The compositions of this invention are easily, formulated by using standard mixing equipment such as a Glen ® or Hobart ® brand mixer. However, the order of addition of certain ingredients is critical. The organic binder is first dissolved in the liquid vehicle. If the organic binder or one of the components comprising the organic binder is of low solubility in the main liquid vehicle, that organic component may be predissolved or softened or hydrated in an appropriate liquid and that combination thereafter dispersed/ dissolved into the main liquid vehicle. Preferably all liquid phase ingredients are added prior to addition of the solid phase ingredients. Compositions of the invention are easily formulated by standard procedures, as shown in the following examples. Examples 1 through 4 set forth procedures for preparing preferred compositions of the invention.

EXAMPLE 1

A batch of the preferred moldable refractory composition was prepared as follows: 0.16 lbs. of Nalco ® 2385 biocide powder was dissolved into 238 lbs. of water in a Glen mixer. Thereafter, 4.4 lbs. of Natrasol ® 250 HHR was dissolved into the biocide containing liquid vehicle to give a 2.1 wt. % aqueous solution having a viscosity reading of 1340 poise when measured with a Brookfield Viscometer using No. 4 spindle at 0.5 rpm. The Natrasol ® powder was slowly added to the liquid vehicle plus biocide until completely dissolved with continuous stirring. After stirring for about 20 minutes, the Natrasol ® 250 HHR was completely dissolved and the aqueous solution became quite thick. Thereafter, 5 lbs. of 40% colloidal silica sol (Ludox ® HS-40 from duPont) added to the thick solution with constant stirring until evenly mixed and a paste-like consistency was achieved. Thereafter, 70 lbs. of ceramic fiber (Fiberfrax ® fiber manufactured by Standard Oil Engineered Materials Company) was slowly added to the paste with constant mixing until a homogenous mixture was attained. The existence of a homogenous mixture was determined by checking for lumps of fiber and dry spots of fiber within the mix. Their absence indicated complete mixing. The resultant moldable refractory composition contained 22.1 wt. % ceramic fiber, 1.5 wt. % colloidal silica dispersion, 1.4 wt. % organic binder and 75 wt. % of water as liquid vehicle. The total % solid, wet density and dried density of this Composition 1 are about 26, 68 lb/ft3 and 18 lb/ft3, respectively.

Lump formation and water separation of this Composition 1 were observed following about two weeks standing in a covered container.

EXAMPLE 2

The procedure of Example 1 was repeated except that a greater amount of colloidal silica dispersion was employed. Composition 2 composed of 22.1 wt. % ceramic fiber, 9.3 wt. % colloidal silica dispersion (corresponding to 3.72 wt. % silica), 1.4 wt. % organic binder and 67.1 wt. % water was prepared by mixing 70 lbs. Fiberfrax ® fiber, 29.5 lbs. Ludox ® HS-40 colloidal silica sol, 4.4 lbs. Natrasol ® 250 HHR and 0.16 lbs. of Nalco 2385 biocide in 212 lbs. water following the procedure described in Example 1. The total % solid, wet density and dried density of this Composition 2 are about 28, 68 lb/ft3 and 19 lb/ft3, respectively. Lump formation and water separation of Composition 2 were observed after about one month standing in a covered container.

Figure 1:
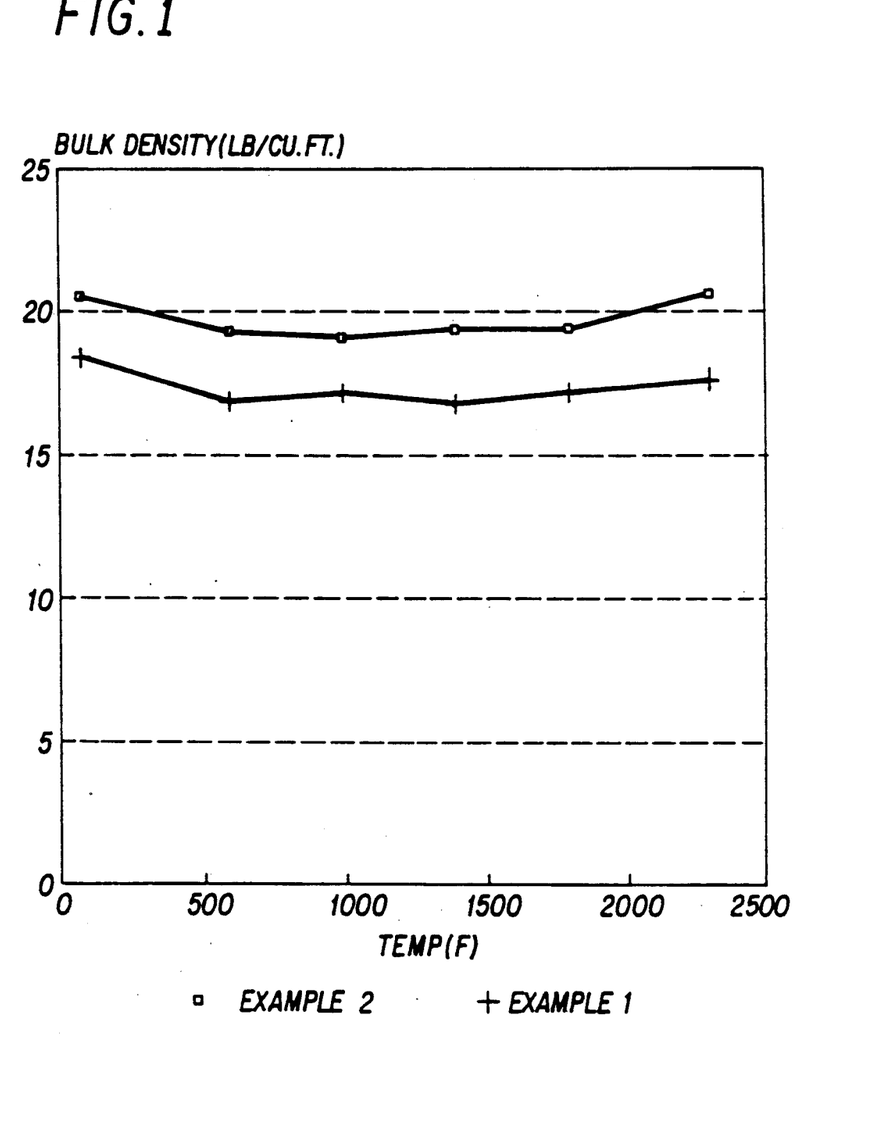
Figure 2:
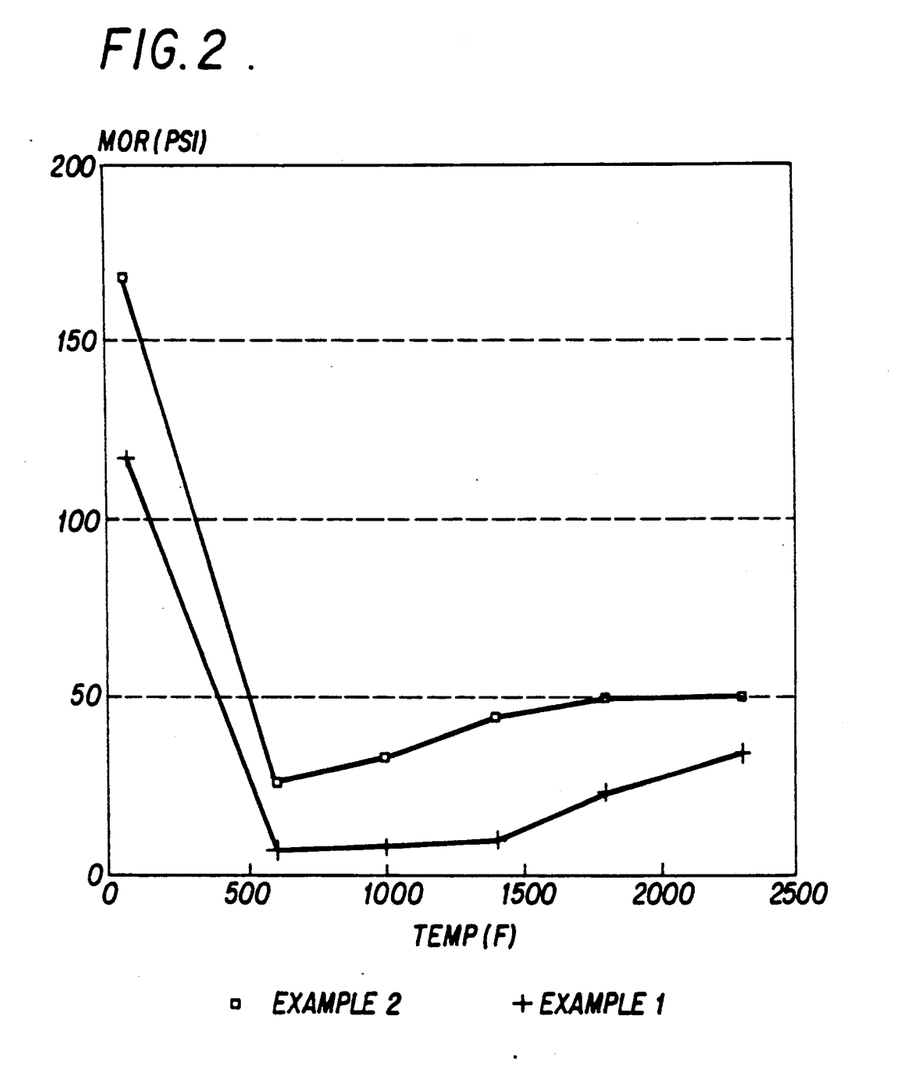

The bulk density and MOR as a function of temperature of the dried refractory moldable compositions from Examples 1 and 2 are compared in FIGS. 1 and 2. The information shown in FIGS. 1 and 2 may be summarized as follows: Upon firing, a small decrease in bulk density is observed (less than 10%) for the Compositions 1 and 2 with the composition of Example 2 being the higher density material. Upon firing to temperature above the decomposition temperature of the organic binder, a significant decrease in MOR was observed. The MOR of Composition 1 decreased by 95% and by 71% at 600°F. and 2300°F. respectively. The MOR of Composition 2 decreased by 85% at 600°F. and by 70% at 2300°F. in the same temperature range. The largest decrease occurred following the initial firing to 600°F. for each of Compositions 1 and 2. The initial large decrease in MOR is due to degradation of the organic binder. The gradual increase in MOR after the initial decrease in MOR is due to consolidation of the $SiO_2$ binder with the fiber and sintering. The higher silica content of Composition 2 resulted in a higher MOR.

EXAMPLE 3

Example 2 was repeated except that a greater amount of organic binder was employed to increase the water retention ability and thus shelf life of the composition. Composition 3 composed of 22.1 wt. % ceramic fiber, 9.3 wt. % colloidal silica dispersion (40 wt. % solid), 2.1 wt. % organic binder and 66.5 wt. % water was prepared by mixing 70 lbs. Fiberfrax ® ceramic fiber, 29.5 lbs. Ludox ® HS-40 colloidal silica sol, 6.6 lbs. Natrasol ® 250 HHR in 210 lbs. of water containing 0.16 lb. Nalco ® 2385 biocide. The total % solid, wet density and dried density of Composition 3 are about 29, 70 lb/ft3 and 20 lb/ft3, respectively. No lump formation or water separation was observed after six months standing. The wet composition exhibited a creamier consistency than the compositions of Examples 1 and 2. This is believed due to improved wetting of the fibers due to the presence of a greater amount of the organic binder component. The MOR of this Composition 3 after drying is 310 PSI. The MOR of this Composition 3 after firing to 2000°F. for 24 hours is 148 PSI.

EXAMPLE 4

Figure 3:
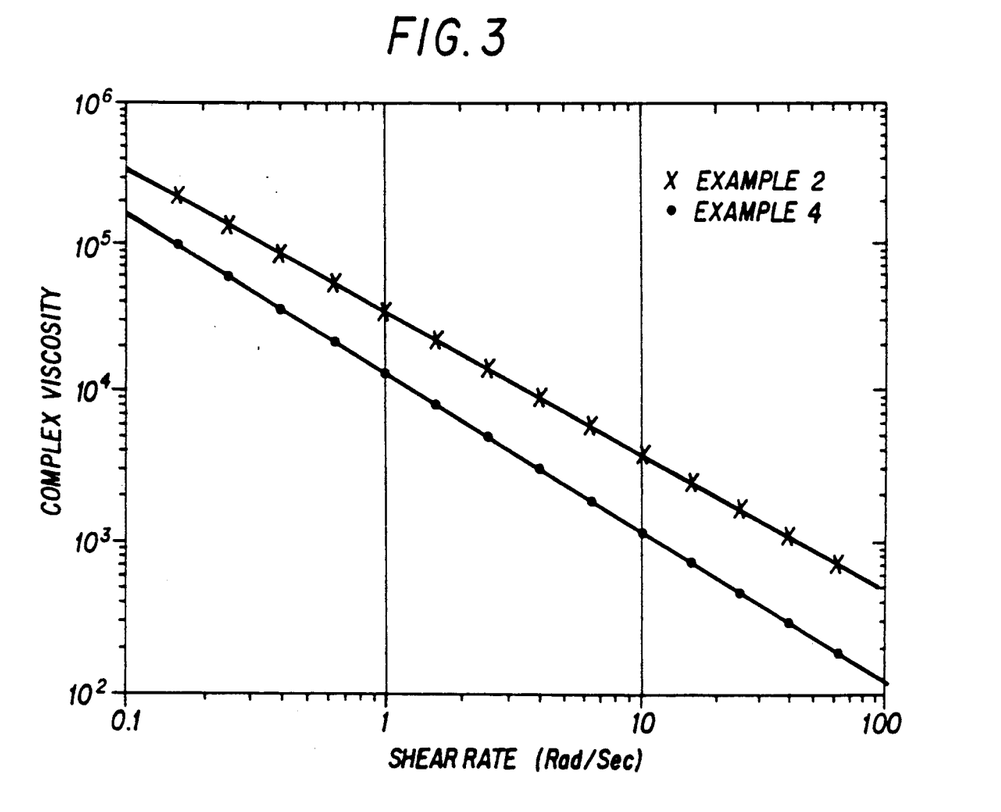

Example 2 was repeated except that the batch size was reduced and a high molecular weight polyethylene oxide organic binder was substituted for that used in Example 2. 0.2 lb. Polyox ® WSR-301 was dispersed in 1 lb. ethylene glycol. Thereafter, this dispersion was slowly added to 26.1 lbs. water. Ethylene glycol was employed to help disperse the Polyox ® WSR-301 resin in water and also to act as an antifreeze agent. Following dissolution of the polyethylene oxide in the water, 3.7 lbs. of Ludox ® HS-40 colloidal silica was added with stirring until the solution/ dispersion became homogenous. Thereafter 8.8 lbs. of Fibergfrax ® ceramic fiber was introduced with stirring until a uniform consistency was obtained. The resulting composition consisting of 22.1% Fiberfrax ® fiber, 9.3% Ludox ® HS-40, 2.5% ethylene glycol, 0.5% polyox WSR-301 and 65.6% water exclusive of that contained within the Ludox ® HS-40 exhibited very high tack to substrate surfaces and to human hands. Its consistency/viscosity was significantly lower than the compositions of Examples 1 through 3. Complex viscosity (eta*) vs. shear rate of this composition 4 was measured with a Rheometric model 705 mechanical spectrometer and is compared with the complex viscosity of Composition 2 as shown in FIG. 3. The dried Composition 4 exhibited lower cohesive strength upon drying than Compositions 1 through 3. Shelf life of Composition 4 was less than a month.

EXAMPLE 5

Example 4 was repeated except that 1 weight % of Polyox ® WSR-301 resin was utilized. As with Example 4, the cohesive strength of the dried Composition 5 was substantially lower than that of the Compositions 1 through 3. The shelf life of Composition 5 was better than three months.

EXAMPLE 6

1.14 lbs. of Natrasol ® 250 HHR was carefully and thoroughly dry mixed with 0.06 lbs. of Polyox ® WSR-301. This powder mixture was slowly added into 53.7 lbs. of water containing 0.03 lbs. Nalco ® 2385 biocide. Following dissolution of the powder mixture in the water, 7.44 lbs. of Ludox ® HS-40 silica sol were introduced and stirring continued until the mixture was homogenous. Thereafter, 17.6 lbs. Fiberfrax ® fiber was added while mixing continuously. Mixing was continued until a uniform consistency was obtained. Composition 6 appeared to be slightly creamier than that of the Composition 2, which did not contain Polyox ® WSR-301. Also, Composition 6 exhibited greater tack. The complex viscosity of Composition 6 was determined to be similar to that of Composition 2. The shelf life of composition 6 was observed to be better than three months. Composition 6 contained 22.1 % Fiberfrax ® fiber, 9.3% of Ludoxx ® HS-40 (corresponding to 3.72% silica), 1.33% Natrasol ® 250 HHR, 0.07% Polyox ® WSR-301 and 67.2% water exclu that contained within the Ludox ® HS-40.

EXAMPLE 7

Example 6 was repeated except that the amount of Natrasol ® 250 HHR was decreased and the amount of Polyoxx ® WSR-301 was increased to yield the following composition: 22.1% Fiberfrax ® fiber, 9.3% Ludox ® HS-40, 1.27% NatrasolR 250 HHR, 0.13% Polyox ® WSR-301 and 67.2% water exclusive of that contained within the Ludox ® HS-40. This Composition 7 also exhibited a consistency slightly creamier than that of the Composition 2 and higher tack. The complex viscosity of Composition 7 was similar to that of Composition 2.

EXAMPLES 8 and 9

Fiberfrax ® fibers having settling volumes of 160 and 390 ml respectively per 5g of the fibers in a standard size 1000 ml graduate cylinder were used to prepare compositions 8 and 9 respectively having a formulation identical to that of Example 3: 22 1 wt. % Fiberfrax ® fiber, 9. 3 wt. % Ludox ® HS-40 (corresponding to 3.72% silica), 2.1% Natrasol ® 250 HHR and 66.4 wt. % water exclusive of that in the silica sol. Composition 8 having lower settling volume which represents a shorter average fiber length exhibited a lighter consistency than compositions 9 and it appeared that better fiber wetting was achieved in composition 8 than that of 9. Softer or lighter consistency compositions are easier to pump at a given pressure. The MOR of compositions 8 and 9 is 227 psi and 310 psi after drying, and 114 psi and 148 psi after firing at 2000° F. for 24 hours, respectively.

EXAMPLES 10 and 11

For composition 10, Saffix ® fiber, a 95 wt. % alumina, 5 wt. % silica fiber available from Imperial Chemical Industries was substituted for Fiberfreax ® fiber in the formulation given in Example 3. Composition 11 was prepared according to Example 3 except that Fibermax ® fiber, a polycrystalline mullite fiber, 72 wt. % alumina and 28 wt. % silica available from Standard Oil Engineered Materials Company was used. Each of compositions 10 and 11 exhibited a softer, lighter and creamier consistency than composition 3. Also, after drying compositions 10 and 11 exhibited a smoother surface than their counterpart composition 3. The MOR of compositions 10 and 11 respectively is 344 psi and 323 psi after drying, and 400 psi and 124 psi after firing at 2000°F. for 24 hours.

EXAMPLES 12 and 13

Example 3 was repeated except that for composition 12 an ammonium counter ion stabilized colloidal silica having 40 wt. % solid and a pH of 9.6 available from E. I. duPont de Nemours Company under the name Ludox ® AS-40 was substituted for Ludox ® HS-40. For composition 13 a non-ionic colloidal silica having 34 wt. % solid and a pH of 3.2 available from Nalco Chemical Company as Code 1034A was substituted for Ludox ® HS-40.

Each of compositions 12 and 13 had a heavier consistency than that of composition 3.

EXAMPLE 14

All the examples described earlier, colloidal silica was used as an inorganic binder in the compositions. When the application involves with directed contact of the dried composition with molten aluminum or magnesium, the silica binder having very fine particles reacts readily with the molten aluminum or magnesium. The reaction can be drastically reduced if colloidal alumina instead of colloidal silica is used as the binder in the composition.

A composition with a colloidal alumina as an inorganic binder was made as follows: 0.5g of Dowicil ® 75 biocide was dissolved into 402g of water in a Hobart mixer. Thereafter, 18.2g of 250 HHR was slowly added into the biocide containing aqueous solution until completely dissolved and the aqueous solution became suite thick. Thereafter, 169g of colloidal alumina sol (Nyacol ® Al/20 from Nyacol Products, Inc. Ashland, MA) was added to the thick solution with constant stirring until evenly mixed and a paste-like consistency was achieved. The alumina sol had a pH of 4 and contains 20 wt. % positively charged alumina particles with a nominal size of 20 nm. Finally, 150g Fiberfrax ® ceramic fiber was slowly added to the paste with constant mixing until a homogeneous mixture was attained. The resultant moldable refractory composition contained 20.3 wt. % ceramic fiber, 22.9 wt. % colloidal alumina dispersion, 2.5 wt. % organic binder, 0.06 wt. % biocide and 54.4 wt. % of water as liquid vehicle. The total percent solid, wet density, dried density, calcined density (after heating the dried composition at 1470°F. for 3 hours) of this composition was about 29, 70 lb/ft$^3$, 20 lb/ft$^3$ and 25 lb/ft$^3$ respectively.

EXAMPLES 15 and 16

When polyvinyl alcohol (Elvanol ®, products of E.I. de Nemours, Wilmington, Delaware) and polyacrylamide (Reten ® 420, products of Hercules, Inc. Wilmington, Delaware) were used to replace Natrasol ® 250 HHR as an organic binder of example 2 or 3, the consistency of the compositions was heavy and lacking of creaminess, possibly due to poor fiber dispersion. Also there is a health hazard associated with polyacrylamide's potential thermal decomposition products.

EXAMPLE 17

This example was to improve the resiliency of the dried compositions at elevated temperatures. A Fiberfreax ® fiber having major chemical composition identical to the Fiberfrax ® fiber used in the above examples but with lower iron and titanium impurities was employed in this example. This fiber and the fiber with higher iron and titanium impurities are designated as LI and HI respectively. Three compositions were made with LI and two compositions were made with HI for comparison. The five compositions are listed in Table 1.

TABLE 1

Compositions for Resiliency Test*

| Composition | Fiber | Fiber Settling** Volume ml | % Fiber | % Ludo ® HS-40 | Natraso ® % 250 HHR | % H₂O |
|---|---|---|---|---|---|---|
| 1 | LI | 720 | 26.4 | 4.9 | 2.1 | 66.5 |
| 2 | LI | 430 | 22.1 | 9.3 | 2.1 | 66.5 |
| 3 | LI | 720 | 22.1 | 9.3 | 2.1 | 66.5 |
| 4 | HI | 620 | 22.1 | 9.3 | 2.1 | 66.5 |
| 5 | HI | 390 | 22.1 | 9.3 | 2.1 | 66.5 |

*.05% Dowicil ® 75 used as a biocide in each composition.
**High settling volume corresponds to longer fiber length.

The resiliency test was measuring the percent recovery of the dried or fired (2000°F./24 hr) composition after it has been compressed to ⅛, ⅓, ½ of its original height for ten minutes. A model 1122 Instron Universal testing instrument was used for the tests, and all the tests were conducted at room temperature (70° F.). The results of Percent Recovery for the dried and fired compositions are listed in Tables 2 and 3.

TABLE 2

Resiliency of Dried Compositions Percent Recovery*

| Composition | ⅛ ho | ⅓ ho | ½ ho |
|---|---|---|---|
| 1 | 98 | 94 | 81 |
| 2 | 98 | 95 | 81 |
| 3 | 97 | 93 | 82 |
| 4 | 97 | 95 | 83 |
| 5 | 93 | 91 | 73 |

*Samples were compressed to ⅛, ⅓ and ½ of their original height ho.

TABLE 3

Resiliency of Fired Compositions (2000° F./24 hrs.) Percent Recovery*

| Composition | ⅛ ho | ⅓ ho | ½ ho |
|---|---|---|---|
| 1 | 94 | 85 | distintegrated |
| 2 | 94 | 84 | distintegrated |
| 3 | 89 | 78 | distintegrated |
| 4 | 90 | 78** | distintegrated |
| 5 | 90 | 78** | distintegrated |

*Samples were compressed to ⅛, ⅓ and ½ of their original height.
**Samples were fragile and fell apart during recovery.

The results suggest that the resiliency of the dried compositions is not significantly affected by the impurity in the fiber, fiber length and fiber, silica contents in the compositions. But, on the other hand, the fiber with lower impurities seems to give a higher resiliency to the fired compositions.

EXAMPLE 18

Example 18 was to impart expandability to the composition described in Example 3. Thus, 2% vermiculite produced by W.R. Grace was incorporated into the composition. After drying, the composition contained about 6% vermiculite. Dilatometric measurements were then carried out on the dried composition and a control containing no vermiculite from 23° C. to 1100° C. using a Netzsch Differential Dilatometer manufactured by Netzch Inc., West Germany. The plots of expansion vs. temperature for the dried composition and the control are compared in FIG. 4. The dried composition exhibited a significant expansion, 4%, from 400 to 750° C., where no expansion but only contraction was observed in the control.

EXAMPLE 19

Example 19 demonstrated the application of the refractory moldable composition on repairing hot spots in the commercial, industrial boilers. The hot spots are generally formed due to the deterioration of the insulation between the steel casing and steam pipes. Prior to the actual trial in a powder plant, a model was built to simulate the actual application. The model which consisted of two steel plates (14"×9"×¼) four inches apart, held by four pieces of ceramic fiber boards, was tightly fitted in a furnace. As the furnace heated up to 1120° F., the average temperature of the exterior steel plate of the model was about 510°F. The exterior steel plate was exposed to the ambient. The temperature measurement was made at nine different locations on the exterior steel plates with a portable thermocouple thermometer (KM 900 manufactured by Kane-May Ltd., Welwyn Garden City, Herts, Great Britain). Upon introducing the composition described in Example 3 through a 1½ hole located at top portion of the exterior steel plate using an air operated Alemite model 7886-B pump (Stewart-Warner Alemite Sales Co., Inc., Buffalo, NY), the average temperature of the steel plate immediately dropped from 510°F. to 150° F. After 54 hours, the average temperature on the steel plate reached to an equilibrium at about 240° F. The initial large drop of temperature to 160° F. was due to water evaporation of the composition.

An actual trial of this application was carried out in a power plant located in Western New York. The hot spot on the boiler steel casing had dimensions of 3'×4'×3"and an average temperature of 600° F. Upon introducing the composition described in Example 3 through three ½" holes, one at a time, two holes located at bottom portion of the hot spot and the other at the top portion, the average temperature on the hot spot immediately dropped from 600° F. to 100° F. After three months the average temperature reached to 130° F. which is a typical temperature on the boiler's steel casing. An air operated ARO model 65814-B pump manufactured by the ARO Corporation, Bryan, Ohio was used to introduce the composition into the hot spot.

EXAMPLE 20

Example 20 demonstrated the application of the composition on repairing hot spots in the commercial, industrial furnace. The hot spots are normally formed due to the deterioration of the insulation between the steel casing and the refractory. A model was also built to simulate the actual application. The model in this example is similar to that described in Example 19, but the interior steel plate was replaced by a layer or wall of refractory bricks. Upon introducing the composition described in Example 3 into the model, which was tightly fitted in a furnace, through a 1 ¼"hole located on the top portion of the exterior steel plate, the average temperature of the steel plate immediately dropped from 500° F. to around 150° F. After 6 hours, the average temperature reached to about 210° F. and the experiment was terminated before reaching the equilibrium temperature. The test indicate that the composition would work in this type application. The Alimite model 7886-B pump was used to introduce the composition into the model. For this type of application, one should be careful and try not to move or displace the refractory bricks during pumping the composition into the hot spots, because the furnace with damaged or loose refractory bricks generates hot spots.

EXAMPLE 21

Example 21 demonstrated the application of the composition at Coke plants. The composition has wide applications in Coke plants. The particular application described here is that of filling the gap between the door frame and buckstay of a Coke oven to prevent heat loss and flame bursting from the residual gas combustion. The gap was developed due to the deterioration of the original insulation. The actual trial was carried out in a Coke plant in Mich. The dimensions of the gap are around 18-20 ft. high, 1 ¼"wide and 3" deep. The composition described in Example 3 was introduced to the gap using the ARO pump described in Example 19. Upon completing the installation, the flame and heat were sealed immediately. The seal remained intact at least six months after the installation.

It has been demonstrated that the moldable refractory compositions which contain ceramic fiber, inorganic and organic binders have appropriate flow characteristics, good dry and fired strengths with resiliency. The compositions have been successfully used to fix the hot spots in the commercial, industrial boilers and furnaces while in operation. Various applications in the Coke ovens for steel industry have been tried with good results. The moldable refractory compositions are a versatile and easy to use high temperature insulation material.

Although the invention has been described in detail through the preceding examples, these examples are for the purpose of illustration only and it is understood that variations and modifications can be made by one skilled in the art without departing from the spirit and the scope of the invention.

What is claimed is:

1. A moldable refractory composition consisting essentially of:
   a. from about 42 to about 83% by weight liquid vehicle;
   b. from about 13 to about 50% by weight ceramic fiber;
   c. from about 0.5 to about 7% by weight of an inorganic binder derived from a colloidal dispersion; and
   d. from about 0.5 to 5% by weight of a high molecular weight polar organic polymer consisting essentially of hydroxyethylcellulose;
   e. the liquid vehicle being a solvent for the organic polymer and a non-solvent for the ceramic fiber;
   f. the wet composition having a percent solid of about 25 to about 40, a density of about 67 to 72 lbs/ft$^3$, a dry density of about 18 to about 25 lbs/ft$^3$ and a fired density of about 20 to about 25 lbs/ft$^3$; and
   g. the composition having a complex viscosity of from about 1000 poise to about 10000 poise at about 100 rpm and a dry MOR of at least 200 psi and a fired MOR of at least 100 psi after firing at about 2000° F. for about 24 hrs.

2. The moldable refractory composition of claim 1 further consisting essentially of an effective amount of a biocide to prevent degradation of the organic polymer prior to use of the composition.

3. The moldable refractory composition of claim 1 wherein the ceramic fiber is from about 20 to about 25% by weight.

4. The moldable refractory composition of claim 1 wherein the inorganic binder is from about 3 to about 5% by weight.

5. The moldable refractory composition of claim 1 wherein the organic polymer is from about 1 to about 3% by weight.

6. The moldable refractory composition of claim 1 wherein the liquid vehicle is from about 70 to about 76% by weight.

7. A moldable refractor composition of claim 1 wherein the liquid vehicle is selected from the group consisting of methanol, ehtanol, oisopropanol, butanol, ehtylene glycol, diethylene glycol, water and mixtures thereof.

8. A moldable refractory composition of claim 1 wherein the ceramic fiber has a diameter of about 0.5 microns to about 20 microns and an aspect ratio of about from at least 20 to 1 to 3000 to 1.

9. A moldable refractory composition of claim 1 wherein the inorganic binder is a colloidal sol selected from a group consisting of silica, alumina, zirconia and mixtures thereof.

10. The moldable refractory composition of claim 1 wherein the organic polymer has a molecular weight of at least 0.8 million.

11. The moldabell refractory composition of claim 2 wherein the biocide is from about 0.05 to about 0.1% by weight.

12. The moldable refractory composition of claim 9 wherein the inorganic binder is silica.

13. The moldable refractory composition of claim 1 wherein the composition has a minimum shelf life of 6 months.

14. A moldable refractory composition consisting essentially of:
   a. from about 42 to about 83% by weight liquid vehicle;
   b. from about 13 to about 50% by weight ceramic fiber;
   c. from about 0.5 to about 5% by weight of an inorganic binder derived from a colloidal dispersion; and
   d. from about 0.5 to 5% by weight of a high molecular weight polar organic polymer selected from the group consisting of hydroxyethylcellulose, methylhydroxyethylcellulose, hydroxypropylmethylcellulose, carboxym, ethylcellulose and combinations thereof;
   e. the liquid vehicle being a solvent for the organic polymer and a non-solvent for the ceramic fiber;
   f. the composition havinga percent solid of about 25 to about 40, a density of about 67 to 72 lbs/ft$^3$, a dry density of about 18 to about 25 lbs/ft$^3$ and a fired density of about 20 to about 25 lbs/ft$^3$; and g. the composition having a complex viscosity of from about 1000 poise to about 10,000 poise at about 100 rpm and a dry MOR of at least 200 psi and a fired MOR of at least 100 psi after firing at about 2000° F. for about 24 hours.

* * * * *